United States Patent [19]

Recker

[11] 4,125,337

[45] Nov. 14, 1978

[54] AUTOMATIC LOCK OPEN COUPLER

[76] Inventor: Florian B. Recker, 802 First St., SE., Dyersville, Iowa 52040

[21] Appl. No.: 829,800

[22] Filed: Sep. 1, 1977

[51] Int. Cl.$^2$ ............................ F16B 7/00; F16D 1/10
[52] U.S. Cl. ...................................... 403/11; 403/322; 403/316; 403/359; 64/6
[58] Field of Search ............... 403/325, 322, 316, 317, 403/318, 319, 327, 359; 64/4, 6, 32 R

[56] References Cited

U.S. PATENT DOCUMENTS

| | | | |
|---|---|---|---|
| 3,827,816 | 8/1974 | Knapp | 403/322 |
| 3,992,119 | 11/1976 | Recker | 403/322 |

*Primary Examiner*—Andrew V. Kundrat
*Attorney, Agent, or Firm*—Henderson, Strom, Sturm, Cepican & Fix

[57] ABSTRACT

A coupling of the type including a housing having a rotating locking sleeve therein for selectively locking the housing to a splined shaft. The locking sleeve is biased to a locked position, but a mechanism is provided for automatically holding the locking sleeve in an unlocked position upon removal of the housing from the shaft whereby the shaft will be automatically locked to the housing upon replacement of the housing on the shaft.

6 Claims, 6 Drawing Figures

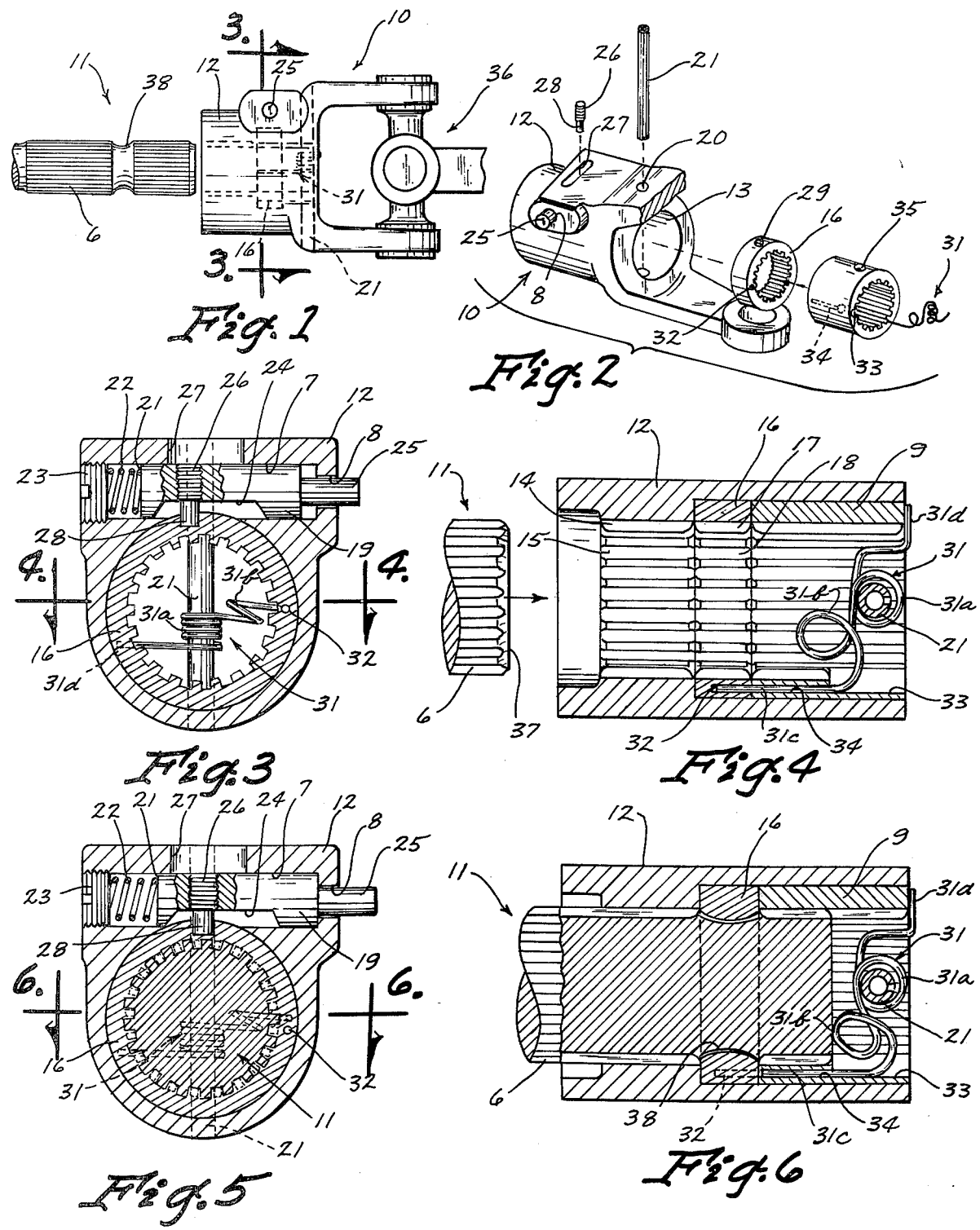

AUTOMATIC LOCK OPEN COUPLER

BACKGROUND OF THE INVENTION

The present invention relates generally to shaft couplings and more particularly to a shaft coupling for transmitting a torque force from one shaft to another.

The problem of how to couple one shaft to another for transmitting a torque force is a longstanding one. This has particularly been a problem in the farming community wherein the power take-off of an agricultural tractor frequently needs to be connected and disconnected to utilize one implement and then another. This problem has been solved in the past in one degree or another, and one of the most commercially successful of these solutions is a connection of the type disclosed in U.S. Pat. No. 2,448,278 to Ronning which was patented in 1948.

In U.S. Pat. No. 2,448,278, a pin is biased to one position within a housing so that it will contact one spline of a power take-off to thereby hold the coupling together. In another position of the pin, it is moved so that it does not block or contact any of the splines and thereby allows the housing to be removed from the power take-off shaft.

Another type of coupling device particularly for use with agricultural equipment is shown in U.S. Pat. Nos. 3,969,033, 3,992,119 and 3,992,120 issued to Recker. These patents disclose a design for locking on all of the splines of a power take-off shaft by use of a rotatable splined and grooved sleeve disposed within a coupler housing. The locking mechanism is biased to a locked position.

Still another example of a type of coupling structure for selectively coupling splined shafts together is shown in U.S. Pat. No. 3,260,541 to Sadler et al, which patent discloses a plurality of balls in a housing which are selectively movable into and out of locking engagement with a power take-off shaft. The balls are biased to locked position.

In all of the above mentioned patents, the devices disclosed require that before the power take-off coupler is connected to the power take-off shaft that the locking mechanism be manually moved to an unlocked position. Then once the coupler is properly positioned on the shaft, the locking mechanism will automatically move to a locked position. To uncouple the shaft, the locking mechanism is manually moved to an unlocked position and the coupler is slid off of the shaft.

It would be very desirable to be able to have such coupling devices of the type referred to above, for example, automatically moved to and held in an unlocked position when the power take-off coupler is removed so that such coupler mechanism could receive the shaft again when re-coupling is desired without the need to manually move or reset the locking mechanism, while still including the feature that the locking mechanism will automatically move to the shaft locking position once the coupler is again connected or pulled on the shaft to the proper position thereof with respect to the coupler mechanism.

SUMMARY OF THE INVENTION

An improved torque transmitting coupling of a type having a housing with a non-circular opening therein adapted to receive a non-circular portion of a shaft. A locking sleeve having a non-circular inner periphery is disposed in the opening and is movable between a position locking the housing to the shaft and an unlocked position, and including a spring for biasing the sleeve to the locked position. A holding mechanism is provided for selectively holding the locking sleeve in the unlocked position in a first position of the holding mechanism whereby the coupler can be freely pushed on the shaft. A mechanism is also provided for automatically moving the holding mechanism to the first position thereof upon removal of the housing from the shaft. A still further mechanism is provided for automatically releasing the holding mechanism when the housing is pushed onto the shaft so that the locking sleeve can automatically lock the shaft to the housing.

An object of the present invention is to provide an improved coupling device for transmitting a torque force from one shaft to another.

Another object of the invention is to provide a coupling device which automatically locks by merely pushing the coupler onto a shaft.

A further object of the invention is to provide a torque transmitting coupling which can be produced by slight modification of existing commercial structures.

Still another object of the invention is to provide a coupling which is both dependable to use and economical to produce.

Other objects, advantages, and novel features of the present invention will become apparent from the follwing detailed description of the invention when considered in conjunction with the accompanying drawings.

BRIEF DESCRIPTION OF THE DRAWINGS

FIG. 1 shows a side elevational view of the coupler of the present invention in readiness to receive a shaft for the purpose of coupling the shaft to the coupler housing;

FIG. 2 is a partial perspective exploded view of the coupler shown in FIG. 1;

FIG. 3 is an enlarged cross sectional view of the present invention taken along line 3—3 of FIG. 1 showing the coupler locked open;

FIG. 4 is a cross sectional view taken along line 4—4 of FIG. 3 showing the coupler in a locked open position;

FIG. 5 is a cross sectional view like FIG. 3, but showing the coupling device with the shaft inserted therein and locked thereto; and FIG. 6 is a cross sectional view taken along line 6—6 of FIG. 5 showing the coupler in a locked position.

DESCRIPTION OF THE PREFERRED EMBODIMENT

Referring now to the drawings wherein like reference numerals designate identical or corresponding parts throughout the several views, FIG. 1 shows preferred embodiment of the coupling 10 in readiness to be attached to the power take-off shaft 11 of the tractor.

The coupling 10 of the present invention is comprised basically of a housing 12 having an opening 13 passing therethrough. One end of the opening 13 has a series of evenly spaced splines 14 and grooves 15 longitudinally disposed therealong. A sleeve 16 is rotatably disposed within the opening 13. The sleeve 16 also has a series of splines 17 and grooves 18 disposed around the inner periphery thereof. These splines 17 and grooves 18 have the same general spacing and configuration as splines and grooves 14 and 15 respectively in the housing 12. The splined sleeve 16 is held in place by a spacer sleeve 9, which is, in turn, locked into position by a roll pin 21 which fits into a hole 20 in one end of the opening 13 of the housing 12. The spacer sleeve 9 also has splines and grooves about the inner periphery thereof.

Directly adjacent the collar 16 is a hole 7 which passes through the housing 12. This hole 7 has a smaller bore 8 on one end thereof. A pin 19 is slidably received in the hole 7, as can best be seen in FIGS. 3 and 5. One end 21 of the pin 19 abuts one end of a spring 22. The other end of the spring 22 abuts a member 23 threaded into the bore 7. Another distinct feature of the pin 19, as shown in FIGS. 3 and 5 is a cut-out portion 24, which is provided in order to allow the sleeve 16 to protrude slightly into the hole 7 in the housing 12. A bolt 26 is threadedly engaged into the pin 19, as best seen in FIGS. 3 and 5. This bolt 26 preferably has a countersunk Allen wrench head, but other interlocking devices are satisfactory. This bolt 26 is inserted through a slot 27 in housing 12. A reduced portion 28, on one end of the bolt 26, is received into a bore 29 in the sleeve 16. It can be seen therefore that the bolt 26 serves to interlock the pin 19 with the sleeve 16, whereby movement of the pin 19 from the first position, in which the pin 19 is not in abutment with the end 31 of the bore 7, to a position, as shown in FIG. 5, wherein the pin 19 is in abutment with the end of the bore 7, effects a respective movement of the sleeve 16 from the first position of the sleeve 16, as shown in FIG. 3, to a second position as shown in FIG. 5.

The coupler shown in this application is an adaptation of the coupler disclosed in U.S. Pat. No. 3,992,119 to Recker, which is incorporated herein by reference. In addition to the basic structure disclosed in this application and in the last mentioned U.S. Patent, a mechanism is provided for selectively holding the locking sleeve 16 in the unlocked position whereby the power take off shaft 11 can be freely received into the opening 13 without it being necessary to manually move the pin 19 and thereby the sleeve 16 from the position shown in FIG. 5 to the position shown in FIG. 3. A spring steel member 31 is provided and is preferably constructed of piano wire or the like. This spring steel member 31 has a plurality of parts including part 31a which is a plurality of convolutions wrapped around the roll pin 21, a loop member 31b which is disposed within the path of the shaft 11 as will be explained below, a straight section 31c and still another section 31d which contacts one end of the spacer member 9.

An opening 32 is provided in the sleeve 16 for a purpose which will also be explained below, and the straight portion 31c of the spring 31 is also received through a cut out portion 33 in the spacer member 9 and through a hole 34 also in the spacer member 9. It is also noted that the roll pin 21 extends not only through the housing 12 but through openings 35 in the spacer member 9 for supporting the spring 31 and for holding the coupling device 10 operably together.

In operation, the tractor would be backed up to an implement having a coupler 10 of the present invention attached thereto, through a universal joint 36 (FIG. 1). The tractor operator would first be sure that the power take off was disengaged such that the shaft 11 is not in motion. The coupler 10 would then be manually placed onto the power take off shaft 11. As this is done, as will be appreciated by viewing FIGS. 1, 3 and 4, the splines 17 on the sleeve are aligned with the splines 14 on the housing 12 and, likewise, the splines and grooves on the member 9 are likewise so aligned such that the power take-off shaft 11 can be easily received within the opening 13 of the housing 12. As the power take-off shaft 11 moves from the position shown in FIG. 4 to the position shown in FIG. 6, the end 37 of the power take-off shaft 11 abuts the loop 31b of the spring 31; and, when this is done, the portion 31c is pushed out of the hole 32 in the sleeve 16 as is shown in FIG. 6. Once this has been accomplished, then the sleeve 16 is free to move to the locked position as is shown in FIGS. 5 and 6 and the sleeve 16 will automatically so move to such position once the splines 17 of the sleeve 16 are received in the groove 38 of the power takeoff shaft 11, which allows the spring 22 to operate and push the pin 19 and thereby the sleeve 16 to such locked position.

When it is desired to remove the coupling from the power take-off shaft 11 or vice versa, the button 25 of the shaft 19 is depressed from the position shown in FIG. 5 to the position shown in FIG. 3 whereby the sleeve 16 is rotated to the unlocked position as shown in FIGS. 3 and 4. As the power take-off shaft 11 is so removed from the opening 13, the loop 31b follows the surface 37 of the power take-off shaft 11 to the left from the position shown in FIG. 6 to the position shown in FIG. 4. This also causes the portion 31c of the spring member 31 to be received within the hole 32 of the sleeve 16 before the sleeve 16 is allowed to rotate (because the end of the power take-off shaft 11 is still holding the sleeve 16 in the position shown in FIG. 4 by the time that the portion 31c is received in the hole 32). Consequently, it will be understood that when the power take-off shaft 11 is removed, the holding mechanism including the member 31c and the hole 32, keeps the locking sleeve 16 in the unlocked position as is shown in FIG. 4. When it is desired to again couple the device to the power take-off shaft, then the loop 31b constitutes a mechanism for automatically releasing the holding mechanism 31c so that the locking mechanism 16 will again function as described above.

Accordingly, it is clear that the disclosed embodiment of this invention does indeed accomplish all of the objects referred to above. Obviously many modifications and variations of the present invention are possible in light of the above teachings. For example, many other types of coupling devices could be held in the open position by the use of the present invention. It is therefore to be understood that, within the scope of the appended claims, the invention may be practiced otherwise than as specifically described.

I claim:

1. A torque transmitting coupling comprising:
   a housing;
   an opening in said housing, a portion of said opening being non-circular, said opening being adapted to receive a non-circular portion of a shaft;
   means for selectively locking the non-circular portion of said shaft into the opening in said housing, said locking means being biased to a locked position and selectively movable to an unlocked position;
   means for selectively holding said locking means in the unlocked position whereby said shaft can be freely received into said opening, said holding means being movable between a first position and a second position;
   means for automatically moving said holding means to the first position thereof when said shaft is removed whereby said holding means holds said locking means in the unlocked position thereof in readiness for reception of said shaft; and means for automatically releasing said holding means by moving the holding means to said second position when said shaft is received into said opening whereby said locking means can move to a locked position.

2. The coupling of claim 1, said locking means comprising:
a portion of said opening being circular; and
a sleeve rotatably disposed within said circular portion of said opening, the inner configuration of said sleeve being of the same general shape as the shape of the non-circular portion of the opening in the housing.

3. The coupling of claim 2 wherein said holding means comprises:
a hole in said sleeve; and
pin means operably connected to said housing, said pin means being received in said hole in the first position of said holding means and being positioned outside of said hole in the second position of said holding means.

4. The coupling of claim 3 wherein said moving means comprises a spring.

5. The coupling of claim 4 wherein said releasing means comprises a projection connected to said pin means and disposed within said opening in the path of said shaft when said shaft is inserted into said opening.

6. The coupling of claim 4 wherein said projection comprises a loop attached to one end of said spring and to said pin means.

* * * * *